United States Patent [19]

Crook

[11] 4,430,297

[45] Feb. 7, 1984

[54] HARD NICKEL-BASE ALLOY RESISTANT TO WEAR AND CORROSION

[75] Inventor: Paul Crook, Fairford, England

[73] Assignee: Cabot Corporation, Kokomo, Ind.

[21] Appl. No.: 110,264

[22] Filed: Jan. 7, 1980

[30] Foreign Application Priority Data

Jan. 11, 1979 [GB] United Kingdom ................. 7901144

[51] Int. Cl.³ .............................................. C22C 19/05
[52] U.S. Cl. ..................................... 420/442; 420/443; 420/445; 420/448; 420/450; 420/453; 420/582; 420/584; 420/587; 420/588
[58] Field of Search ..................... 75/171, 170, 134 F, 75/122

[56] References Cited

U.S. PATENT DOCUMENTS 4,093,454 6/1978 Saito et al. ............................ 75/171
4,183,774 1/1980 Balleret ............................. 75/134 F
4,331,741 5/1982 Wilson ................................ 420/453

FOREIGN PATENT DOCUMENTS 572339 3/1959 Canada .

*Primary Examiner*—R. Dean
*Attorney, Agent, or Firm*—Jack Schuman; Joseph J. Phillips

[57] ABSTRACT

Disclosed is a hard wear resistant nickel based alloy including a carbide-former, preferably niobium, and essentially cobalt free but which has similar properties to cobalt, chromium, tungsten, carbon alloys. Typically the alloy has a composition, in parts by weight, Cr-34 C-1.2, Mo-10, Fe-3, Si-1, Nb-3, Ni-balance. The alloys of the invention are suitable for surface or welding consumables, and as articles for making hardfacing depositions.

16 Claims, No Drawings

HARD NICKEL-BASE ALLOY RESISTANT TO WEAR AND CORROSION

This invention relates to hard alloys and surfacing and welding consumables. In particular, it relates to nickel-based hard alloys which are resistant to wear and corrosion.

Nickel-based alloys are widely available commercially. Some of the most common of nickel-based alloys are the so-called "super alloys" which are normally strengthened by the intermetallic, gamma-prime phase. These alloys are not resistant to wear to the same degree as for example, alloys sold under the Registered Trade Mark Stellite.

Another well known group of nickel-based alloys are those which contain silicon and boron and sometimes chromium. These are hardened by precipitates containing boron. However they are brittle and thus of limited use under cyclic loading conditions.

It has been proposed to formulate nickel-based alloys containing chromium, carbon and molybdenum or tungsten in an attempt to produce a general purpose, wear-resistant alloy. Such attempts have centred around producing an alloy which contains relatively high levels of carbon. As a consequence of high carbon level, these attempts have lead to an alloy whose toughness and tensile strength are limited.

Hard metal alloys, based on cobalt, are well known. Typically, they contain tungsten, chromium and carbon in addition to the cobalt. A range of such alloys is commercially available under the registered Trade Mark 'Stellite'. In this range of alloys, the proportions of chromium and tungsten increase with increasing carbon.

There is also a need for hard, wear-resistant alloys which are cobalt free. Such alloys are especially useful in nuclear engineering where the presence of cobalt is undesirable because of its particular radioactive half-life. By hard it is meant that the alloy has a hardness greater than approximately 300 VPN.

Accordingly, the present invention provides a nickel-based hard alloy having essentially the following composition (excluding impurities) or a surfacing or welding consumable whose formulation is such that on being melted it is capable of producing an alloy which (ignoring the effect of any dilution thereof by substrate material) has essentially the following composition (excluding impurities):

| | | % by weight of composition |
|---|---|---|
| (a) | Chromium | 26 to 40 |
| (b) | one or both of molybdenum and tungsten | 6 to 15 |
| (c) | carbon | 0.55 to 2.5 |
| (d) | one or more of niobium, titanium, vanadium tantalum, hafnium and zirconium | 1 to 7.5 |
| (e) | one or both of silicon and manganese | 0 to 5 |
| (f) | copper | 0 to 5 |
| (g) | aluminium | 0 to 2 |
| (h) | one or more rare earths | 0 to 2 |
| (i) | boron | 0 to 1 |
| (j) | iron | 0 to 25 |
| (k) | nickel | balance | wherein (1) there is at least 35% by weight of nickel in the composition, (2) the combined weight of boron (if present) and carbon is 2.5% or less.

(3) one or more of vanadium, tantalum, hafnium and zirconium are present only when the carbon content exceeds 1.0%

Alloys made in accordance with the present invention have properties approaching those of conventional cobalt-based alloys (Co-Cr-W-C) sold under the registered Trade Mark Stellite. The selection of any particular alloy in accordance with the composition may be made so as to meet specific requirements (such as a specified hardness).

Chromium, molybdenum and tungsten act as carbide formers and also help to strengthen the solid solution in an alloy according to the invention. Chromium and one or both of molybdenum and tungsten are present in relatively high proportions compared with conventional nickel based hard facing alloys. The presence of chromium and one or both of tungsten and molybdenum in such relatively high proportions is one characteristic feature of alloys according to the invention.

Another characteristic feature of alloys according to the present invention is that they contain niobium and/or one or more of vanadium, tantalum, titanium, hafnium and zirconium. These metals are highly active carbide formers which modify the type and morphology of the carbides and release more molybdenum (and/or tungsten) and chromium to the solid solution. The highly active carbide makes possible the formation of a hard alloy based on nickel with cobalt being absent (apart from its presence as an adventitious impurity) and without carbon being present in such high proportions that the alloy is rendered unduly brittle.

When the carbon content is 1% or less the chosen carbide former is niobium or, less preferably, titanium. The presence of niobium or titanium allows age hardening of low carbon (1% or less) alloys through the formation of $Ni_3Nb$ and $Ni_3Ti$.

One or both of silicon and manganese may be present. These constituents increase the fluidity of the alloys when molten.

If desired, alloys according to the invention may contain up to 5% by weight of copper which enhances their resistance to certain corrosive media. They may also include up to 2% by weight of aluminium which allows formation of the gamma prime phase in the solid solution particularly if titanium is also present.

Alloys according to the invention may also contain up to 2% by weight of one or more rare earths. The inclusion of rare earths such as lanthanum or preferably Yttrium may be desirable if an alloy according to the invention is required to have enhanced resistance to oxidation at very high temperatures. For a general purpose alloy, it is generally desirable not to employ more than 7.5% by weight of constituents (e) to (i) inclusive.

An alloy according to the invention preferably contains from 42 to 52% by weight of nickel.

An alloy according to the invention preferably contains from 30 to 37% by weight of chromium.

Preferably, the alloys according to the invention contain no boron. If boron is present, it does not constitute more than 1% to the total weight of the alloy.

Preferably the minimum carbon level is 0.9% by weight and the maximum carbon level 1.5% by weight.

An alloy according to the invention preferably contains from 1 to 4% by weight of the highly active carbide former such as niobium which is particularly preferred since it can not only form carbides but also the intermetallic compound Ni₃Nb.

Iron may be present at a level up to 25% but preferably at a level not in excess of 5% by weight.

A preferred alloy according to the present invention may conform to the following composition (excluding impurities):

|  | % by weight |
|---|---|
| Ni | 42–52 |
| Cr | 30–37 |
| One or both of Mo and W | 8–12 |
| C | 0.9–2 |
| Fe | 0–5 |
| One or more preferential carbide formers | 1–4 |
| Si | 0–2 |

Up to 2% by weight of manganese may be added to this composition if desired, in place of some or all of the silicon.

An example of an alloy according to the invention is as follows (impurities excluded).

|  | % by weight |
|---|---|
| Cr | 34 |
| C | 1.2 |
| Mo | 10 |
| Fe | 3 |
| Si | 1 |
| Nb | 3 |
| Ni | balance |

This alloy has an as cast hardness of 380 VPN, (Vickers Pyramid No.) an ultimate tensile strength of 38 tons force per square inch. (59 H Bar), and a percentage elongation of 1%. Such an alloy may be used as a general purpose wear-resistant alloy.

In alloy of the present invention, analogously to the stellite alloys, the more carbon that is employed, the greater is the proportion of chromium that should preferably be present. In addition, the greater the proportion of carbon, preferably, the greater is the proportion of highly active carbide former and/or the greater is the proportion of molybdenum and/or tungsten. Preferably also unless there is 1% by weight or less of carbon there is at least 32% by weight of chromium. Even if there is 1% by weight, or less of carbon there may still with advantage be 32% or more by weight of chromium.

The alloys according to the present invention may be prepared by mixing their respective ingredients and melting the resultant mixture, for example in a furnace, at a temperature in the order of 1550° C. The melting may take place in a protective atmosphere of inert gas such as argon or nitrogen or under vacuum. The molten alloy may be formed into a powder by being atomised or by other means, may be made as a casting, by, for example being poured into an appropriately shaped mould or may be formed into a wire or rod. The powder wire or rod may be formed into a cored wire or rod. The powder, wire or rod may be used as hard facing or welding consumables which may be coated with a suitable flux. It may also be possible to make forgings from alloys according to the invention, if their carbon content is less than 1% by weight.

Engineering or other components may be made as a casting or forging from an alloy of the invention, or they may be formed by compacting and or sintering a corresponding powder.

Alloys of the invention may be employed in susbstantially all applications for which conventional cobalt-based wear-resistant alloys are currently used.

They may, for example, be employed in the hard facing of engine valves, steam control valves and flow control valves for use in the chemicals industry. They are of particular use in the nuclear industry as they contain no cobalt (apart from that present as an impurity).

A surfacing consumable according to the invention may be used to deposit a wear resistant coating on a substrate. A welding consumable according to the invention may be used to deposit wear resistant weld metal.

An alloy according to the invention may be shaped so as to provide the surfacing or welding consumable. Materials which in use of the consumable are not intended to become an integral part of the metallic deposit may be added, for example flux and arc stabilisers. Thus a rod or alloy according to the invention may be coated with flux and/or arc stabilisers to form a welding or surfacing consumable according to the invention.

It is possible to produce what is in effect a chemical equivalent to a welding consumable or surfacing consumable according to the invention. In such an equivalent consumable the alloy is in effect formed in situ as a metallic deposit from the consumable. This metallic deposit may be diluted almost instantaneously by the base or substrate material diffusing into or intermixing with the deposit, or vice versa. For example, some but not all constituents of the metallic deposit may be present in one discrete part of the consumable and others in another part. Thus, for example, iron may be present in an alloy forming a hollow tube, and say, nickel, molybdenum, chromium, silicon, and carbon as a powder within the tube. The tube may also typically contain a flux and arc stabilising material.

The kind of consumable in which some but not all constitutents are present in one discrete part of the consumable and others in another part may take the form of a cored wire. In such a consumable there will be near to 100% recovery of all the constitutents of the consumable in the deposit excluding arc stabilisers, flux and the like, and also with the exception that not all the silicon and/or manganese will in general be recovered, particularly if the consumable contains a flux, in which instance, in use, a part of the silicon and/or manganese tends to enter the slag which forms on the surface of the metallic deposit. Such consumables may therefore contain 1 to 2% by weight more silicon and/or manganese that it is intended to recover in the deposit.

The term "impurities" as used herein encompasses both adventitious impurities and any element or substrate deliberately added which does not significantly influence the properties of an alloy according to the invention.

Desirably, relatively pure constituents are employed in making an alloy according to the invention.

Examples of alloys according to the invention are set out in Table 1 and their physical properties in Table 2.

TABLE 1

| Alloy Ref. No. | C | Ni | Fe | Cr | W | Mo | Si | Mn | Nb | V | Ti | Ta | Zr | B | Cu | Y | Al |
|---|---|---|---|---|---|---|---|---|---|---|---|---|---|---|---|---|---|
| 1 | 1.2 | Bal | 3.9 | 33.6 | | 8.7 | 1.2 | | 3.0 | | | | | | | | |
| 2 | 1.29 | Bal | 3.0 | 34.0 | | 8.9 | 0.9 | 3.0 | | | | | | | | | |
| 3 | 1.11 | Bal | 3.5 | 33.7 | | 9.1 | 1.0 | | | 3* | | | | | | | |
| 4 | 1.03 | Bal | 3.5 | 34.2 | | 11.8 | 1.1 | | | | 3* | | | | | | |
| 5 | 1.09 | Bal | 4.5 | 34.5 | | 8.2 | 1.9 | | | | | 3* | | | | | |
| 6 | 1.05 | Bal | 4.0 | 33.4 | | 9.0 | 1.0 | | 2.6 | | | | | | 3* | | |
| 7 | 1.11 | Bal | 3.6 | 26.6 | | 9.0 | 1.3 | | 3.1 | | | | | 1* | | | |
| 8 | 1.03 | Bal | 4.2 | 33.8 | | 10.3 | 1.3 | | | | 1* | | | | | | 1* |
| 9 | 1.67 | Bal | 4.5 | 34.7 | | 9.0 | 0.8 | | 3.0 | | | | | | | | |
| 10 | 2.04 | Bal | 6.8 | 35.4 | | 11.3 | 1.5 | | 5* | | | | | | | | |
| 11 | 2.22 | Bal | 4.4 | 35.6 | 15.0 | | 0.8 | | | 1.9 | | | | | | | |
| 12 | 0.82 | Bal | 2.6 | 33.4 | 11.6 | | 0.4 | | 2.7 | | | | | | | | |
| 13 | 1.06 | Bal | 8.6 | 33.0 | 11.7 | | 0.5 | | 2.8 | | | | | | | | |
| 14 | 1.02 | Bal | 2.9 | 33.4 | 11.4 | | | 2* | 2.6 | | | | | | | | |
| 15 | 0.58 | Bal | 2.7 | 33.1 | 11.9 | | 1.2 | | 1.88 | | | | 0.5 | | | | |

*Nominal content

TABLE 2

| Alloy ref. No. | Hardness VPN[1] | UTS[2] Tonf/in$^2$ | UTS H Bar | % Elongation | Corrosion (% wt loss) | Oxidation (% wt gain) |
|---|---|---|---|---|---|---|
| 1 | 381 | 38 | 59 | 1.0 | 1.6 | 0.031 |
| 2 | 370 | | | | | 0.052 |
| 3 | 350 | 35 | 54 | 0.5 | 0.3 | 0.038 |
| 4 | 340 | 43 | 66 | 1.5 | 0.2 | 0.016 |
| 5 | 316 | 31 | 48 | 0.5 | 4.7 | 0.019 |
| 6 | 362 | 47 | 73 | 1.0 | 0.4 | |
| 7 | 333 | 44 | 68 | 1.0 | 5.8 | 0.036 |
| 8 | 343 | 41 | 63 | 0.5 | 0.1 | 0.017 |
| 9 | 409 | 21 | 32 | 0.5 | 4.7 | 0.031 |
| 10 | 475 | 23 | 36 | 0.5 | 2.8 | 0.023 |
| 11 | 471 | 20 | 31 | 0.5 | | |
| 12 | 307 | 42 | 65 | 2.0 | 0.0 | 0.025 |
| 13 | 360 | 43 | 66 | 1.0 | 2.1 | 0.022 |
| 14 | 332 | 45 | 69 | 1.0 | 0.5 | 0.020 |
| 15 | 338 | 43 | 66 | 1.0 | 1.9 | 0.014 |

[1] Vickers Pyramid Number
[2] Ultimate Tensile strength

The methods used in the determination of the physical properties were as follows.

ROOM TEMPERATURE HARDNESS

Room temperature hardness of each alloy was determined using a standard Vickers hardness tester (obtainable from Vickers Limited). Indentations were formed in a parallel sided specimen (precision cast and polished on one face by successive use of silicon carbide paper and diamond polishing wheels) under a load of 30 kg. The result quoted is an average of five readings.

ULTIMATE TENSILE STRENGTH (UTS) AND ELONGATION

Tensile testing of the alloys was carried out using a Hounsfield Tensometer (available from Monsanto Limited) and test pieces precision cast to the dimensions specified in British Standard 18, described in Methods for Tensile testing of metals published by the British Standards Institute. For each alloy test pieces were first X-ray inspected, and three tests were performed the average ultimate tensile strength and percentage elongation being quoted.

CORROSION IN ROOM TEMPERATURE AQUA REGIA

To determine the resistance of each alloy to room temperature aqua regia, a precision cast test piece of known weight and approximate surface area 30 cm$^2$ was totally immersed in 100 cm$^3$ of aqua regia for 100 hours. After immersion, the samples were washed, brushed lightly to remove any scale, and reweighed. The weight loss, as a percentage of the original weight was used as a measure of resistance.

OXIDATION IN STILL AIR

To determine the resitance of each alloy to oxidation in still air a precision cast test piece of known weight and approximate surface area 30 cm$^2$ was placed in a muffle furnace at 900° C. for 25 hours. Temperature control in the muffle furnace was to within plus or minus 2° C.

To enable spalled oxide scale to be collected and counted in the final weight gain measurement, each sample was held in a high-sided platinum dish during oxidation. The total weight gain as a percentage of the original weight was used as a measure of oxidation resistance.

As shown by Tables 1 and 2 the alloys made in accordance with the present invention have acceptable hardness and tensile properties excellent resistance to corrosion (as a result of the presence of a high level of chromium in the solid solution) and adequate oxidation resistance.

If a suitable carbide former is not present (as in alloy No. 16) to modify the carbide second phase and to release more chromium and molybdenum/tungsten to the solid solution, the tensile properties and corrosion resistance are much reduced.

A comparison of the properties of an alloy according to the present invention (No. 1) a similar carbide-former free alloy (No. 16) and a Co-Cr-W-C stellite alloy (No. 17) is given in Table 4. The composition of the alloys is shown in Table 3.

TABLE 3

| Alloy Ref No. | composition by weight | | | | | | | | |
|---|---|---|---|---|---|---|---|---|---|
| | C | Ni | Co | Fe | Cr | Mo | W | Si | Nb |
| 1 | 1.2 | Bal | | 3.9 | 33.6 | 8.7 | | 1.2 | 3.0 |
| 16 | 1.88 | Bal | | 3.5 | 33.3 | 10.6 | | 0.8 | |
| 17 | 1.22 | 1.0 | Bal | 2.9 | 25.7 | 0.3 | 5.1 | 1.0 | |

TABLE 4

| Alloy Ref No. | Hardness (VPN) | UTS Tonf/in$^2$ | UTS H Bar | Elongation % | corrosion % wt loss | oxidation % wt gain |
|---|---|---|---|---|---|---|
| 1 | 381 | 38 | 59 | 1.0 | 1.6 | 0.031 |

TABLE 4-continued

| Alloy Ref No. | Hardness (VPN) | UTS Tonf/in² | UTS H Bar | Elongation % | corrosion % wt loss | oxidation % wt gain |
|---|---|---|---|---|---|---|
| 16 | 380 | 23 | 36 | 0.5 | 9.3 | 0.010 |
| 17 | 420 | 54 | 83 | 1.2 | 6.5 | 0.019 |

Elevated temperature properties of alloys similar to No. 1 (No. 18) and comparative alloy No. 17 (No. 19) are compared in Table 6. The composition of the alloys is given in Table 5.

TABLE 5

| Alloy Ref No. | C | Ni | Co | Fe | Cr | Mo | W | Si | Nb |
|---|---|---|---|---|---|---|---|---|---|
| 18 | 1.04 | Bal | — | 3* | 34* | 10* | — | 0.99 | 3* |
| 19 | 1.18 | 2.2 | Bal | 2.7 | 27.1 | 0.5 | 5.2 | 1.3 | — |

*nominal content

TABLE 6

| | Alloy No. 18 | | | | Alloy No. 19 | | | |
|---|---|---|---|---|---|---|---|---|
| Temperature °C. | UTS Tonf/in² | UTS H Bar | % Elongation | HARDNESS VPN | UTS Tonf/in² | UTS H Bar | Elongation % | HARDNESS VPN |
| R.T | 45 | 69 | 1.0 | 386 | 54 | 83 | 1.2 | 366 |
| 400 | 37 | 57 | 0.8 | | 43 | 66 | 2.7 | |
| 500 | | | | 318 | | | | 297 |
| 600 | 38 | 59 | 1.0 | | 38 | 59 | 2.8 | |
| 700 | | | | 264 | | | | 264 |
| 800 | 33 | 51 | 3.0 | | 33 | 51 | 7.6 | |

The properties at elevated temperature were determined as follows:

ELEVATED TEMPERATURE TENSILE PROPERTIES

The elevated temperature tensile properties were determined by use of a Hounsfield Tensometer and its high temperature tensile attachments. These comprise a muffle furnace (obtained from Wild Barfield Limited) with suitable hot zone and a set of extension rods and collets manufactured from an alloy resistant to high temperature oxidation. The temperature of the furnace hot zone was controlled to plus or minus 5° C. during testing. Samples were held at the test temperature for ten minutes prior to stressing (to allow complete heating). For each alloy and temperature at least two tests are performed. The results quoted are averages.

The above results demonstrate that at temperatures of the order of 700° C. an alloy made in accordance with the invention and its cobalt-based counterpart have similar hardness values and ultimate tensile strengths. These properties can be related to the ability of the alloys to resist deformation.

What is claimed is:

1. A nickel-based hard alloy consisting essentially of the following composition (excluding impurities)

| | | % by weight of composition |
|---|---|---|
| (a) | chromium | 32 to 40 |
| (b) | molybdenum plus tungsten | 8 to 15 |
| (c) | carbon | 0.55 to 2.5 |
| (d) | one or more elements selected from the group consisting of niobium, titanium, vanadium, tantalum, hafnium and zirconium | 1 to 7.5 |
| (e) | silicon plus manganese | 0 to 5 |
| (f) | copper | up to 5 |
| (g) | aluminium | 0 to 2 |
| (h) | one or more elements selected from the group consisting of the rare earths | 0 to 2 |
| (i) | boron | 0 to 1 |
| (j) | iron | 0 to 25 |
| (k) | nickel | balance | wherein
(1) there is at least 42% by weight of the nickel in the composition:
(2) the combined weight of boron (if present) and carbon is not greater than 2.5%;
(3) one or more elements from the group consisting of vanadium, tantalum, hafnium and zirconium are present only when the carbon content exceeds 1.0%;

said alloy being cobalt-free except as an adventitious impurity and made by first melting the alloy and then casting the molten alloy into a useful form.

2. An alloy as claimed in claim 1 in which the composition contains from 0.4% to 2.5% by weight of silicon plus manganese.

3. An alloy as claimed in claim 1 containing from 0.9 to 1.5% by weight of carbon.

4. An alloy as claimed in claim 1, containing up to 5% by weight of iron.

5. An alloy as claimed in claim 1 in which the rare earth is yttrium.

6. An alloy as claimed in claim 1 containing from 1 to 4% by weight of one or more elements selected from the group consisting of niobium, vanadium, hafnium, tantalum, titanium and zirconium.

7. An alloy as claimed in claim 1 in which boron is present.

8. An alloy as claimed in claim 1 in which the composition contains 7.5% by weight or less of constituents (e) to (i).

9. An alloy as claimed in claim 1 in which tungsten is absent.

10. A nickel-based hard alloy consisting essentially of the following composition (excluding impurities)

| | % by weight |
|---|---|
| Ni | 42 to 52 |
| Cr | 32 to 37 |
| Mo plus W | 8 to 12 |
| C | 0.9 to 2 |
| Fe | 0 to 5 |
| One or more elements selected from the group consisting of Nb, Hf, V, Ti, Ta and Zr | 1 to 4 |
| Mn | 0 to 2 |

|    | % by weight |
|----|---|
| Si | up to 2 | said alloy being cobalt-free except as an adventitious impurity and made by first melting the alloy then casting the molten alloy into a useful form.

11. An alloy as claimed in claim 1, having the following composition (excluding impurities):

|    | % by weight |
|----|---|
| Cr | about 34 |
| C  | about 1.2 |
| Mo | about 10 |
| Fe | about 3 |
| Si | about 1 |
| Nb | about 3 |
| Ni | balance |

12. A surface or welding consumable having a formulation that produces, on being melted and disregarding the effect of any dilution thereof by substrate material, an essentially cobalt free alloy consisting essentially of the following composition:

|    |    | % by weight of composition |
|----|----|---|
| (a) | chromium | 32 to 40 |
| (b) | molybdenum plus tungsten | 8 to 12 |
| (c) | carbon | 0.55 to 2.5 |
| (d) | one or more elements selected from the group consisting of niobium, titanium, vanadium, tantalum, hafnium and zirconium, | 1 to 7.5 |
| (e) | silicon plus manganese | 0 to 5 |
| (f) | copper | up to 5 |
| (g) | aluminium | 0 to 2 |
| (h) | one or more elements selected from the group consisting of the rare earths | 0 to 2 |
| (i) | boron | 0 to 1 |
| (j) | iron | 0 to 25 |
| (k) | nickel | balance | wherein
(1) there is at least 42% by weight of nickel in the composition;
(2) the combined weight of boron (if present) and carbon is not greater than 2.5%;
(3) one or more elements from the group consisting of vanadium, tantalum, hafnium and zirconium are present only when the carbon content exceeds 1.0%.

13. A surface or welding consumable according to claim 12 capable of producing an alloy having the following composition:

|    | % by weight |
|----|---|
| Ni | 42 to 52 |
| Cr | 32 to 37 |
| Mo plus W | 8 to 12 |
| C | 0.9 to 2 |
| Fe | 0 to 5 |
| one or more elements selected from the group consisting of Nb, Hf, V, Ti, Ta and Zr | 1 to 4 |
| Mn | 0 to 2 |
| Si | up to 2 |

14. A surfacing consumable according to claim 12 in the form of an article for making hardfacing depositions.

15. A surface consumable according to claim 12 in the form of a cored wire.

16. A welding consumable according to claim 12 in the form of a welding rod.

* * * * *